United States Patent
Kuhn

[15] 3,673,264
[45] June 27, 1972

[54] METHOD OF PREPARING OPTICALLY ACTIVE PROPYLENE CHLOROHYDRINS AND PROPYLENE OXIDES

[72] Inventor: Stephen Joseph Kuhn, Sarnia, Ontario, Canada

[73] Assignee: The Dow Chemical Company, Midland, Mich.

[22] Filed: May 21, 1968

[21] Appl. No.: 730,929

[52] U.S. Cl.............................................260/633, 260/348.6
[51] Int. Cl................................................................C07c 31/34
[58] Field of Search...........................................260/633, 634

[56] References Cited

UNITED STATES PATENTS 2,788,350   4/1957   Lafyatis et al. ..........................260/633
3,491,152   1/1970   Howard et al......................260/635 X

OTHER PUBLICATIONS

Fickett et al., J. Am. Chem. Soc. 73, p. 5,063– 5,067 (1951)
Price et al., J. Am. Chem. Soc. 78 pp. 4,787– 4,788 (1956)
Rieche et al., Ber 92 pp. 83– 85, 87, 90– 91 (1959).
Sen, Quarterly J. Ind. Chem. Suc., Vol. 1, pp. 1– 8 (1924– 1925)
Morrison et al., Organic Chemistry, Allyn & Bacon, Boston, 1962, pp. 551– 552
Franzus et al., J. Org. Chem., Vol. 31, pp. 4,286– 4,288, 1966
Abderhalden, Ber. 51, 1,320, 1918.

*Primary Examiner*—Howard T. Mars
*Attorney*—Griswold & Burdick and C. E. Rehberg

[57] ABSTRACT

Optically active chlorohydrins are prepared by the action of dichloromethyl methyl ether on an optically active propylene glycol in the presence of a metal halide catalyst. Further treatment of said chlorohydrins with a strong base yields a substantially pure optically active propylene oxide. Said optically active propylene oxides have the same utilities as racemic propylene oxide which may be used as a monomer and chemical intermediate, and additionally, the polypropylene oxide produced from an optically active propylene oxide monomer is a solid, crystalline, optically active polymer. Other utilities for an optically pure sample of a chlorohydrin or propylene oxide are obvious to one skilled in the art.

6 Claims, No Drawings

METHOD OF PREPARING OPTICALLY ACTIVE PROPYLENE CHLOROHYDRINS AND PROPYLENE OXIDES

BACKGROUND

I. Dichloromethyl methyl ether has been used as a chlorinating agent for several types of compounds by A. Rieche and H. Gross (Ber., 92, 83 (1959)).

II. The previous methods of making optically active propylene oxide are:

A. E. Avderhalden and E. Eichwald, Ber., 51, 1,316 (1918).

This reference teaches the preparation of optically active propylene oxide by reacting D-tartaric acid with 1-amino-2-chloro-propane followed by diazotization of the product and treatment with water to yield the D-2-chloro-1-propanol. This was treated with base to produce the optically active oxide.

B. W. Fickett, H. K. Garner, and H. J. Lucas, J.A.C.S., 73, 5,063 (1951).

This reference teaches the preparation of optically active 2-chloro-1-propanol and the propylene oxide; the oxide was an intermediate and not isolated.

C. 1. P. A. Levene and A. Walti, J. Bio. Chem., 68, 415 (1926).
2. C. C. Price and M. Osgan, J.A.C.S., 78, 4,787 (1956).
3. N. Shieh and C. C. Price, J. Org. Chem., 24, 1,169 (1959).
4. B. Franzus and J. H. Surridge, J. Org. Chem., 31, 4,286 (1966).

All of the above references teach the reaction of HBr with optically active propylene glycol to form a propylene bromohydrin mixture. The bromohydrins are then separated and further reacted with base to form the optically active propylene oxides. This separation must be effected due to the fact that the 2-bromo-1-propanol is a highly racemized product.

SUMMARY OF THE INVENTION

It has now been discovered that an optically active propylene glycol reacts with dichloromethyl methyl ether ($Cl_2CH$—$O$—$CH_3$) to produce in high yields a propylene chlorohydrin mixture, most of which is the optically active 1-chloro-2-propanol isomer. This reaction proceeds in about 90 percent yield and is described as follows:

(1)
$$D(+)-CH_3CH-CH_2 + Cl_2CH-O-CH_3 \xrightarrow{cat.} D(+)-CH_3CH-CH_2 + L(-)-CH_3CH-CH_2$$
$$\quad\ \, |\quad\ \, | \qquad\qquad\qquad\qquad\qquad\qquad\quad |\quad\ \, | \qquad\qquad\quad |\quad\ \, |$$
$$\quad\ OH\ \ OH \qquad\qquad\qquad\qquad\qquad\qquad OH\ \ Cl \qquad\qquad\ Cl\ \ OH$$
$$\qquad\qquad\qquad\qquad\qquad\qquad\qquad\qquad\qquad 75\% \qquad\qquad\qquad 15\%$$

(2)
$$L(-)-CH_3CH-CH_2 + Cl_2CH-O-CH_3 \xrightarrow{cat.} L(-)-CH_3CH-CH_2 + D(+)-CH_3CH-CH_2$$
$$\quad\ \, |\quad\ \, | \qquad\qquad\qquad\qquad\qquad\qquad\quad |\quad\ \, | \qquad\qquad\quad |\quad\ \, |$$
$$\quad\ OH\ \ OH \qquad\qquad\qquad\qquad\qquad\qquad OH\ \ Cl \qquad\qquad\ Cl\ \ OH$$
$$\qquad\qquad\qquad\qquad\qquad\qquad\qquad\qquad\qquad 75\% \qquad\qquad\qquad 15\%$$

It is further discovered that a substantially pure sample of an optically active propylene oxide can be prepared by treating each of the above propylene chlorohydrin mixtures, or the individual constituents of either mixture, with base. The reaction proceeds with complete retention of configuration from the 1-chloro-2-propanols to the propylene oxide and with 100 percent inversion of configuration from the 2-chloro-1-propanols to the propylene oxide. The reaction sequence is further illustrated as follows:

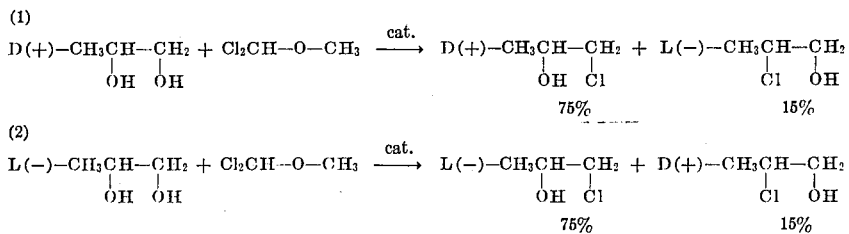

The reaction between an optically active propylene glycol and the dichloromethyl methyl ether proceeds to the 1-chloro-2-propanol with complete retention of configuration, and to the 2-chloro-1-propanol isomer with a complete inversion of configuration. The 1-chloro isomer may be easily separated from the 2-chloro isomer if desired by fractional distillation on an efficient column with the 1-chloro-2-propanol isomer being the lower-boiling constituent.

This successful preparation of the chloropropanols was most surprising in the face of the fact that several previous attempts to prepare the chloropropanols via chlorination of propylene glycol with the common chlorinating agents, viz., $POCl_3$, $PCl_5$, and $SOCl_2$, had formed the cyclic esters in preference to the chloropropanols and that the more unusual chlorinating agents, such as $S_2Cl_2$ and N, dimethylformamidethionyl chloride adduct, had produced only low yields of the desired chloropropanols.

To obtain best results one adds essentially one mole of dichloromethyl methyl ether to react with each mole of an optically active propylene glycol, either in solution or alone, suitably at a temperature range of about −25° to 25°C., with agitation of the reaction mixture. Upon complete addition of the dichloromethyl methyl ether and after the evolution of HCl ceases, one then optionally adds a metal halide catalyst as described below, adjust the reaction temperature to between about 40°–80°C, cools the reaction mixture to about room temperature, separates the catalyst, if used, from the reaction mixture by any suitable means, with a common filtration process being the most convenient, and then separates the optically active chloropropanols from the reaction mixture by any suitable means, with fractional distillation being a convenient and satisfactory method. The catalyst, if used, is added after the evolution of HCl ceases and before raising the temperature above 25°C. The chloropropanol mixture, or each individual isomer, may then be further reacted with a base, such as KOH or NaOH, to produce the optically active propylene oxide. Generally, adding the chloropropanols to an aqueous basic solution and then heating this agitated mixture to about 50°–70C. produces the propylene oxide which distills out of the mixture as it is formed.

A 1:1 molar ratio of propylene glycol to the dichloromethyl methyl ether is preferred since excess of the latter results in chlorinated by-products.

A reaction solvent is not essential but may be used advantageously to better control the maximum reaction temperature. Chloroform is a convenient solvent since its boiling point represents about the optimum reaction temperature for the second step of the reaction. Other suitable solvents are the aromatic hydrocarbons, ethers, esters, and chlorinated hydrocarbons.

The preferred catalyst is $ZnCl_2$ but other mild catalytic metal halides, such as $BiCl_3$ and $CdCl_2$, may be used. The catalyst range is suitably 0.01–1.00 percent by weight. The use of a catalyst is optional but preferred.

Pressure on the reaction is not essential and atmospheric pressure is convenient.

The reaction temperature is the most important variable in determining the ratio of isomeric chloro-propanol products. A satisfactory temperature range during the addition of the chlorinating ether to the glycol is −25° to +25°C with the preferred range being −5° to +10°C and about 0°C being the most preferred. An increase in temperature above 0°C results in an increasing amount of 2-chloro-1-propanol in the final product. During the second stage of the reaction wherein the evolution of HCl has ceased and the catalyst has been added, if used, the suitable temperature range is about 40° to 80°C. Above 80° the product yield of the chloropropanols decreases.

SPECIFIC EMBODIMENTS

The following examples illustrate the method of the invention.

EXAMPLE 1

D(+)-propylene glycol, 1 mole, was dissolved in 250 ml. of dry chloroform. The solution was placed into a 1-liter glass reaction flask equipped with a mechanical stirrer, reflux condenser, dropping funnel, and a cooling bath. The solution was cooled to 0°C and 1 mole of dichloromethyl methyl ether was added to the stirred solution during a 20-minute period. In about 5–10 minutes the reaction mixture turned turbid and after a few minutes vigorous HCl evolution had begun. After 20–30 minutes the first step of the reaction was over and the mixture became homogeneous. $ZnCl_2$, 0.1 g., was added to the reaction mixture and the temperature was raised to the boiling point and the mixture refluxed for 1 hour. After cooling, the $ZnCl_2$ was filtered and the chloroform was distilled off using a Vigreux column. The mixture of chloropropanols was then fractionated at atmospheric pressure using an Oldershaw column. 69.8 g. of pure D(+)-1-chloro-2-propanol was obtained. Boiling point 126°–127°C; $[\alpha]_D^{25} + 6.9°$, neat; $d^{25}_4 = 1.083$. The L(−)-1-chloro- 2-propanol was prepared in a similar manner from L(−)-propylene glycol and had rotation $[\alpha]_D^{25} - 6.92°$, neat; $d^{25}_4 = 1.084$.

EXAMPLE 2

110 gms. of 30 percent aqueous KOH solution was placed in a distilling flask and heated to 50°C. 47 g. (0.5 mole) of mixed chloropropanols obtained from D(+)-propylene glycol as described in Example 1 was dropped into the solution in 5–10 minutes, whereupon the temperature of the reaction mixture was raised to 70°C. while the mixture was stirred. The propylene oxide distilled out of the mixture as it was formed and was collected in an ice-salt cooled receiver. 23 g. of propylene oxide was obtained. The crude distillate was purified by refluxing over anhydrous KOH for 20 minutes, then redistilling it over anhydrous KOH. Thus pure D(−)-propylene oxide was obtained, boiling point 34.5°–35.5°C; $[\alpha]_D^{18} - 13.4°$, neat. The L(+)-propylene oxide was prepared in a similar way by starting with the chloropropanols obtained from the L(−)-propylene glycol and had rotation of $[\alpha]_D^{18} + 13.42°$, neat.

I claim:

1. A process for preparing optically active propylene chlorohydrin comprising reacting by contacting optically active propylene glycol with dichloromethyl methyl ether at a temperature maintained in the range of from about −25° to 25°C. until the evolution of HCl substantially ceases and then adjusting the temperature to about 40°–80°C.; said process being optionally conducted in the presence of a catalyst selected from the group consisting of $ZnCl_2$, $BiCl_3$ and $CdCl_2$, which is added to the reaction mixture after the evolution of HCl has ceased and before raising the temperature above 25°C.

2. The process defined in claim 1 wherein the catalyst is $ZnCl_2$.

3. The process defined in claim 2 wherein the reaction temperature is maintained at about −5° to +10°C. until the evolution of HCl ceases.

4. The process defined in claim 3 wherein the reaction mixture is cooled, the $ZnCl_2$ separated from the mixture, and the optically active propylene chlorohydrin recovered.

5. A mixture of (D)-1-chloro-2-propanol and (L)-2-chloro-1-propanol prepared by the process of claim 1 wherein said glycol is D-propylene glycol.

6. A mixture of (L)-1-chloro-2-propanol and (D)-2-chloro-1-propanol prepared by the process of claim 1 wherein said glycol is (L)-propylene glycol.

* * * * *